(12) United States Patent
Garikipati et al.

(10) Patent No.: US 12,744,736 B2
(45) Date of Patent: Sep. 22, 2026

(54) ACCESS POINT NAME TOTAL BANDWIDTH LIMITS

(71) Applicant: Mavenir Systems, Inc., Richardson, TX (US)

(72) Inventors: Srinivas Garikipati, Bangalore (IN); Abhishek Mishra, Bangalore (IN); Vipin Padlikar, Bangalore (IN); Tamanna Jindal, McKinney, TX (US)

(73) Assignee: Mavenir Systems, Inc., Richardson, TX (US)

( * ) Notice: Subject to any disclaimer, the term of this patent is extended or adjusted under 35 U.S.C. 154(b) by 98 days.

(21) Appl. No.: 18/485,727

(22) Filed: Oct. 12, 2023

(65) Prior Publication Data

US 2024/0129244 A1 Apr. 18, 2024

(51) Int. Cl.
*G06F 15/173* (2006.01)
*H04L 47/24* (2022.01)
*H04L 47/32* (2022.01)

(52) U.S. Cl.
CPC .............. *H04L 47/24* (2013.01); *H04L 47/32* (2013.01)

(58) Field of Classification Search
CPC ..... H04L 47/24; H04L 47/32; H04L 41/0896; H04L 5/0035; H04W 72/27; H04W 88/08; H04W 28/20; H04W 48/20
See application file for complete search history.

(56) References Cited

U.S. PATENT DOCUMENTS 12,089,090 B2 * 9/2024 Dhammawat ......... H04W 28/20
12,101,380 B2 * 9/2024 Poscic .................. H04L 12/189
2011/0296125 A1 * 12/2011 Shaikh ................ H04W 12/062 709/227
2013/0088956 A1 * 4/2013 Zhou ..................... H04W 28/02 370/230
2014/0355436 A1 * 12/2014 Zhang ................. H04L 43/0882 370/232

(Continued)

FOREIGN PATENT DOCUMENTS

WO 2022165235 8/2022

OTHER PUBLICATIONS

Extended European Search Report for corresponding European application EP23203993.3; 5 pages; dated Mar. 12, 2024.

*Primary Examiner* — Suraj M Joshi
*Assistant Examiner* — Hao H Nguyen
(74) *Attorney, Agent, or Firm* — Ruggiero McAllister & McMahon LLC

(57) ABSTRACT

There is provided a method for sharing bandwidth consumption information in a communication system having a first user plane function (UPF), a second UPF and a third UPF, each of which serves an access point name (APN). The method includes (a) receiving by the first UPF from the second UPF, information indicating a bandwidth being consumed by the second UPF, (b) receiving by the first UPF from the third UPF, information indicating a bandwidth being consumed by the third UPF, (c) sending from the first UPF to the second UPF, information indicating a bandwidth being consumed by the first UPF and the third UPF, and (d) sending from the first UPF to the third UPF, information indicating the bandwidth being consumed by the first UPF and the second UPF. Thus, each of the first, second and third UPFs is aware of a total bandwidth being consumed for the APN.

18 Claims, 3 Drawing Sheets

(sharing current bandwidth consumption for APN 205)

(56) References Cited

U.S. PATENT DOCUMENTS

2015/0223068 A1* 8/2015 Thelen ................ H04W 12/069
726/7
2016/0112896 A1* 4/2016 Karampatsis ........... H04L 47/22
370/230.1
2016/0143040 A1* 5/2016 Rivard .................. H04W 24/08
370/329
2016/0381573 A1* 12/2016 Roeland .............. H04L 41/0894
455/552.1
2018/0376363 A1* 12/2018 Zhou ..................... H04W 48/02
2019/0158408 A1* 5/2019 Li ......................... H04W 72/56
2019/0253917 A1* 8/2019 Dao .................. H04M 15/8228
2021/0105214 A1* 4/2021 Goel ..................... H04W 76/18
2022/0132510 A1* 4/2022 Kahn .................... H04W 72/53
2022/0191737 A1* 6/2022 Mindler ............ H04W 28/0967
2022/0386179 A1* 12/2022 Dhammawat ......... H04W 28/20
2023/0156091 A1* 5/2023 Poscic ................... H04L 67/141
370/254
2023/0164729 A1* 5/2023 Ryu ...................... H04W 60/04
370/329
2024/0015569 A1* 1/2024 Doostnejad ............. H04L 47/24
2024/0205107 A1* 6/2024 Kanakaraj ............... H04L 41/16

* cited by examiner

ACCESS POINT NAME TOTAL BANDWIDTH LIMITS

CROSS-REFERENCE TO RELATED APPLICATIONS

The present application claims priority to Indian Provisional Patent Application No. 202221059526 filed on Oct. 18, 2022, the entirety of which is incorporated by reference herein.

BACKGROUND OF THE DISCLOSURE

1. Field of the Disclosure

The present disclosure relates to telecommunications systems, and more particularly, accessing of data by users of an Access Point Name (APN) or Data Network Name (DNN) in a data network.

2. Description of the Related Art

The approaches described in this section are approaches that could be pursued, but not necessarily approaches that have been previously conceived or pursued. Therefore, the approaches described in this section may not be prior art to the claims in this application and are not admitted prior art by inclusion in this section.

A User Plane Function (UPF) performs operations such as packet routing and forwarding, packet inspection, maintaining an internet protocol (IP) session, policy enforcement, and quality of service (QoS) handling.

In a user plane infrastructure, there may be a requirement to implement bandwidth limits amongst a group of users. For example, a retail chain enterprise may wish to limit a total bandwidth of all employees collectively to not exceed a limit of X megabits per second (Mbps). In another example, a communication service provider (CSP) may set up a telecom infrastructure spread across different regions, which also consists of multiple UPFs that enable many private players/enterprises to use services and use a maximum bandwidth of X Mbps amongst all its users connected via the multiple UPFs.

A grouping of users and identification of enterprises is done using the concept of APN (Access Point Name) or DNN (Data Network Name).

To enable the CSP to implement maximum bandwidth limits of a group (APN/DNN) where there are multiple UPFs serving one group (APN/DNN), each UPF in the infrastructure needs to be aware of the current maximum bandwidth values of all the other UPFs of a group (APN/DNN) to be able to limit the bandwidth of the group to one configured value. For example, the CSP may configure the maximum bandwidth access of all users accessing data using the APN "XYZ Corp" amongst all the UPFs should be under 100 Mbps, which means the total of bandwidth across all the UPFs amongst all users of the APN should be under 100 Mbps. Enabling each UPF in the infrastructure aware of the total bandwidth consumption across all UPFs for a group (APN/DNN) shall enrich UPF to make a decision on how much more bandwidth is left over to be allowed based on the maximum bandwidth configured.

When such a use case as mentioned above is needed to be implemented by a CSP, and if access to the network for a particular group (APN/DNN) is handled by different UPFs available in the network, each UPF would be agnostic on what is the current bandwidth utilization of that group in other multiple UPFs. This situation would push the CSP to implement only one UPF for a group, thus restricting flexibility, and in scenarios where multiple UPFs are needed to be implemented in the network, this use case would not be feasible to be deployed by the CSP.

SUMMARY OF THE DISCLOSURE

The present document discloses a solution to share the bandwidth occupancy of each UPF instance to all the UPF nodes in a network serving a specific group (APN/DNN). This enables all UPF instances to be aware of the current total bandwidth consumed by all users in a particular APN/DNN across all UPF instances, and act accordingly. Acting accordingly may include dropping packets, prioritizing packets, etc. A CSP may choose to implement this feature or use case to all the groups (APN/DNNs) or only to certain APN/DNNs. Hence only for the needed APN/DNNs, this bandwidth utilization information exchange can be implemented at multiple UPFs serving those corresponding APN/DNNs.

The solution is not only applicable to APN/DNN-based groupings, but applicable to any alternate nomenclatures used to group the access. The solution is a UPF self-contained proposal, and there is no dependency on a control plane (CP) function to implement the same.

There is provided a method for sharing bandwidth consumption information in a communication system having a first UPF that serves an APN, a second UPF that serves the APN, and a third UPF that serves the APN. The method includes (a) receiving by the first UPF from the second UPF, information indicating a current bandwidth being consumed by the second UPF for the APN, (b) receiving by the first UPF from the third UPF, information indicating a current bandwidth being consumed by the third UPF for the APN, (c) sending from the first UPF to the second UPF, information indicating a current bandwidth being consumed by the first UPF for the APN and the current bandwidth being consumed by the third UPF for the APN, and (d) sending from the first UPF to the third UPF, information indicating the current bandwidth being consumed by the first UPF for the APN and the current bandwidth being consumed by the second UPF for the APN. Each of the first UPF, the second UPF and the third UPF is thus aware of a total current bandwidth being consumed by the first UPF, the second UPF and the third UPF for the APN.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
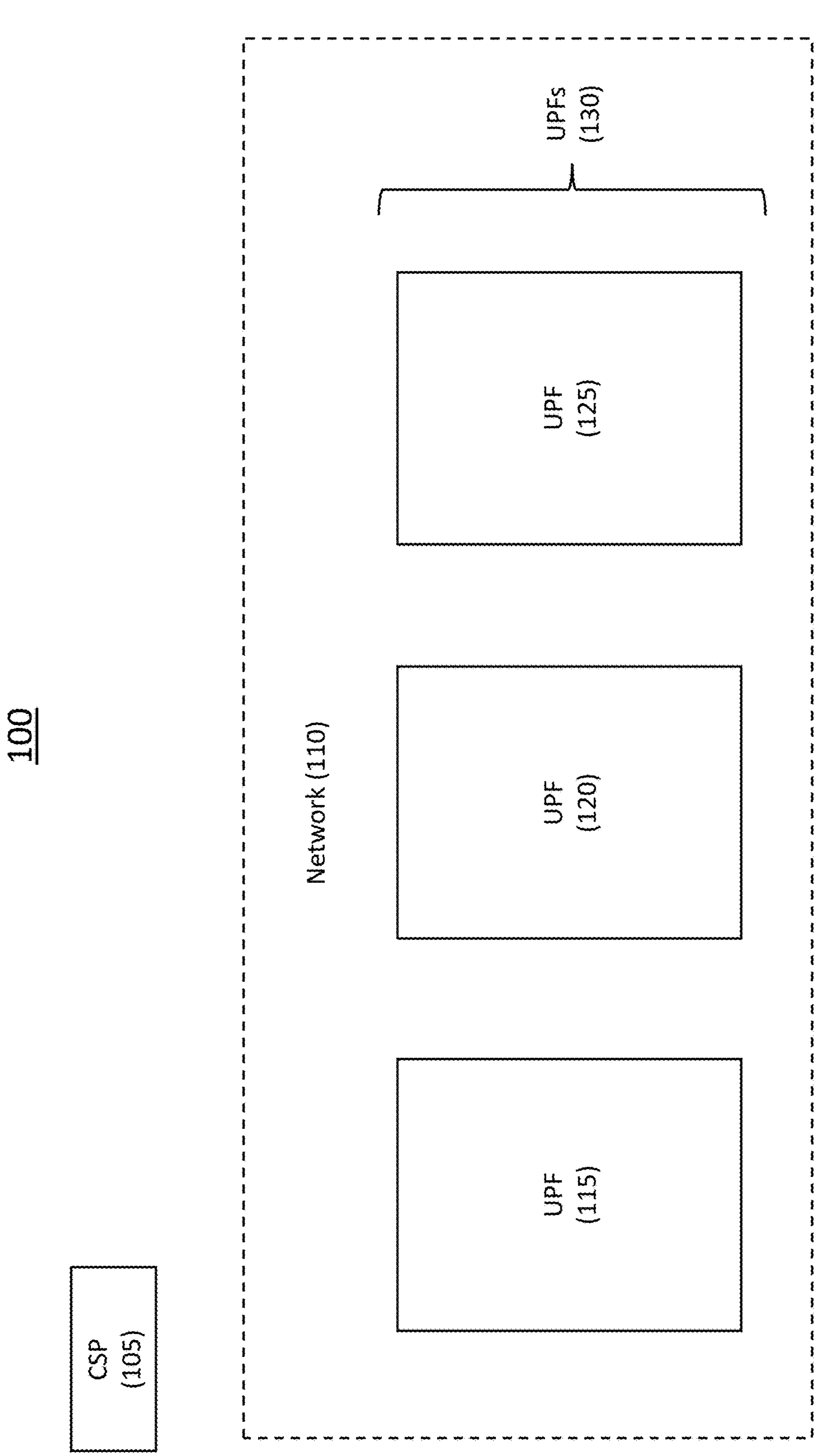
FIG. 1 is a block diagram of a system that shares, among its UPFs, APN total bandwidth limits.

FIG. 1 is a block diagram of a communication system, namely system 100, that shares among its UPFs, APN total bandwidth limits. System 100 includes a CSP 105, a network 110, and UPFs 115, 120 and 125. UPFs 115, 120 and 125 are collectively referred to as UPFs 130.

Network 110 is a data network. CSP 105 maintains network 110. UPFs 130 perform operations in network 110, as described below.

Although system 100 is shown as having three UPFs, namely UPFs, 115, 120 and 125, in practice, network 110 may contain any number of UPFs.

Figure 2:
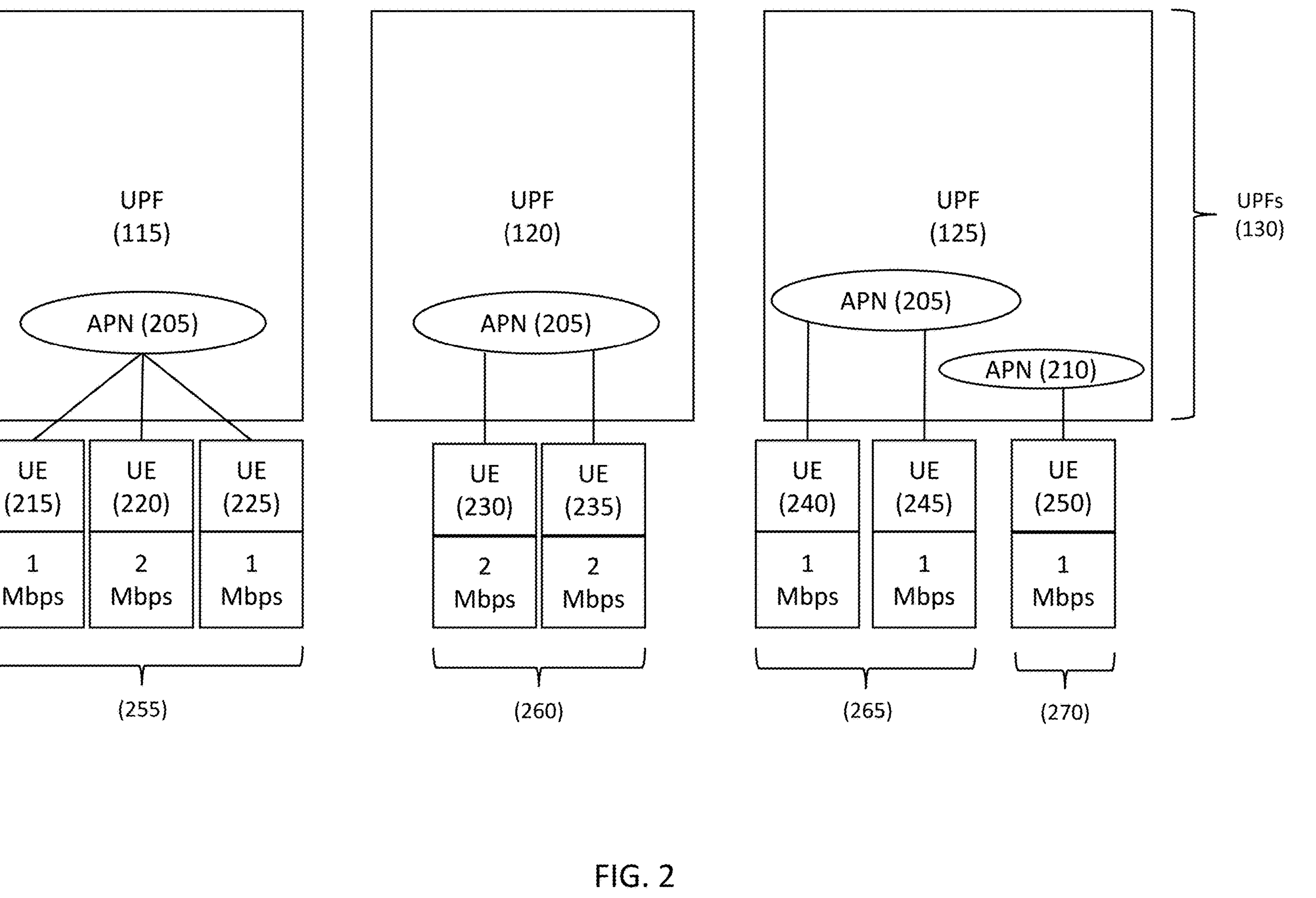
FIG. 2 is a block diagram of an example in which UPFs are serving APNs, and in which user equipment are accessing data services at various bandwidth speeds, in the system of FIG. 1.

FIG. 2 is a block diagram of an example in which UPFs 130 are serving APNs 205 and 210, and in which user equipment (UEs) 215, 220, 225, 230, 235, 240, 245 and 250 are accessing data services at various bandwidth speeds measured in Mbps.

APN 205 is being served by UPF 115, UPF 120 and UPF 125. An example of APN 205 could be an enterprise called XYZ Corp that has a contract with CSP 105 to use a maximum of X Mbps amongst all of XYZ Corp's users (i.e., delivery agents of the group). In this example, the connected users of XYZ Corp are (UEs) 215, 220, 225, 230, 235, 240 and 245.

UPF 115, through APN 205, is serving UE 215, UE 220 and UE 225. In other words, each of UE 215, UE 220 and UE 225 is accessing data services through APN 205 connected through UPF 115. At a given instance of time, UE 215 is accessing at a speed of 1 Mbps, UE 220 at a speed of 2 Mbps, and UE 225 at a speed of 1 Mbps.

UPF 120, through APN 205, is serving UE 230 and UE 235. Both of UE 230 and 235 are accessing at a speed of 2 Mbps.

UPF 125, through APN 205, is serving UE 240 and UE 245. Both of UE 240 and UE 245 are accessing at a speed of 1 Mbps.

Thus, through APN 205:

(a) UPF 115 is serving a total bandwidth of 4 Mbps, represented by reference 255;

(b) UPF 120 is serving a total bandwidth of 4 Mbps, represented by reference 260; and (c) UPF 125 is serving a total bandwidth of 2 Mbps, represented by reference 265.

Additionally, UPF 125, through APN 210, is serving UE 250, and UE 250 is accessing at a speed of 1 Mbps, represented by reference 270.

Figure 3:
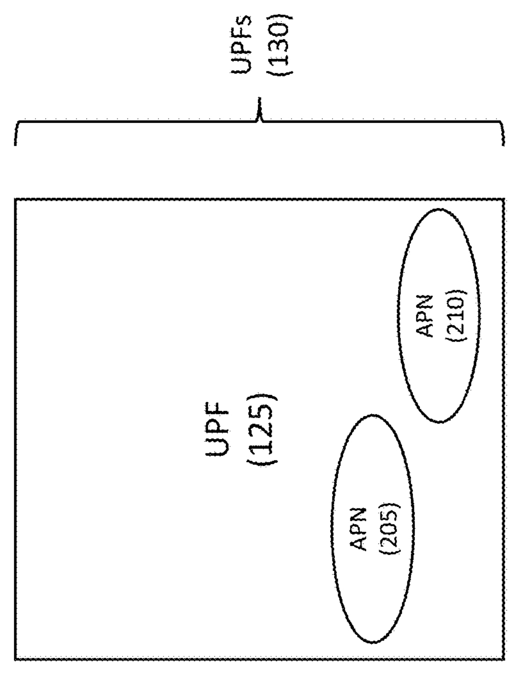
FIG. 3 is a signal flow diagram of a process of sharing of total bandwidth per APN among UPFs for the example in FIG. 2.
Figure 3:
Figure 3:
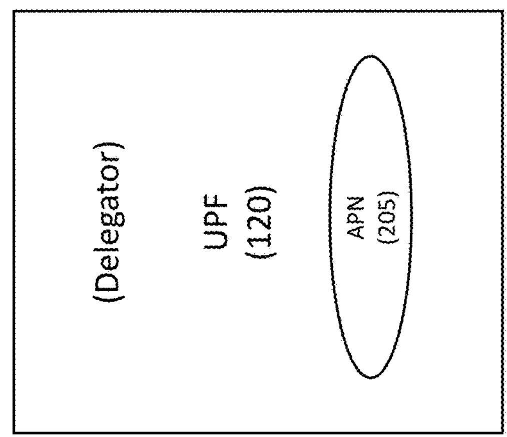
Figure 3:
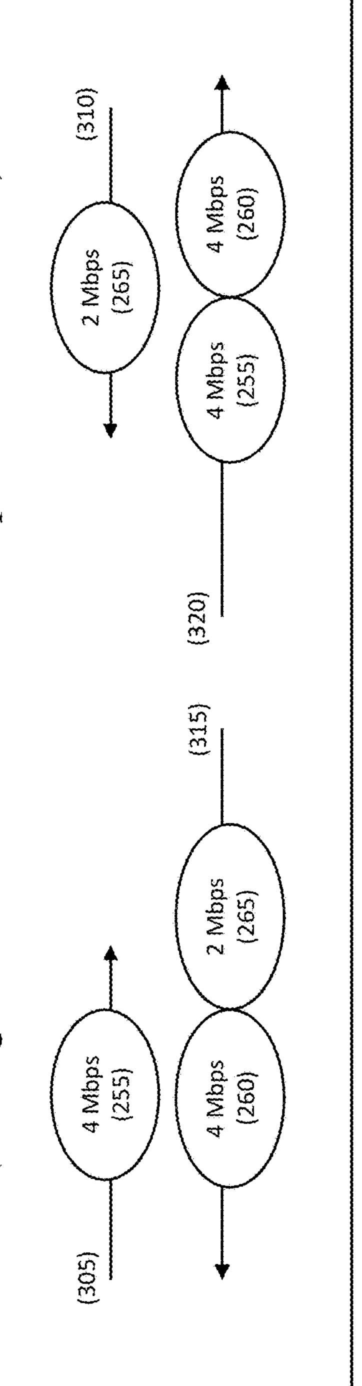
Figure 3:
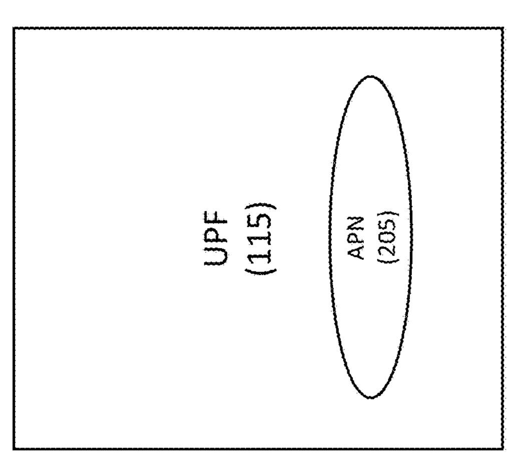

FIG. 3 is a signal flow diagram of a process of sharing of total bandwidth consumption per APN/DNN among UPFs 130 for the example in FIG. 2.

Using any leader election method, one of UPFs 130 would be nominated as a delegator. Assume that UPF 120 is nominated as the delegator. In a case of a failure of the delegator, an alternate delegator, e.g., UPF 115, shall be elected.

UPFs 130 communicate with one another by way of signaling messages through network 110.

In operation 305, UPF 115 shares its current bandwidth consumption for APN 205, to UPF 120, i.e., the delegator. In the present example, UPF 115's current bandwidth consumption for APN 205 is 4 Mbps, i.e., reference 255.

In operation 310, UPF 125 shares its current bandwidth consumption for APN 205, to UPF 120, i.e., the delegator. In the present example, UPF 125's current bandwidth consumption for APN 205 is 2 Mbps, i.e., reference 265.

In operation 315, UPF 120 shares current bandwidth consumption for APN 205 of UPF 120 and UPF 125 individually, to UPF 115. In the present example, current bandwidth consumption for APN 205 of UPF 120 and UPF 125 is 4 Mbps (reference 260) and 2 Mbps (reference 265), respectively.

In operation 320, UPF 120 shares current bandwidth consumption for APN 205 of UPF 120 and UPF 115 individually, to UPF 125. In the present example, current bandwidth consumption for APN 205 of UPF 120 and UPF 115 is 4 Mbps (reference 260) and 4 Mbps (reference 255), respectively.

In the present example, UPF 120 has shared the current bandwidth consumption for APN 205 of UPF 120 and UPF 115 to UPF 125, and also shared the current bandwidth consumption of UPF 120 and UPF 125 to UPF 115. Thus, UPF 120, i.e., the delegator, has shared current bandwidth consumption for APN 205 of all the UPFs to each of the peer UPFs.

As shown at block 325, all UPFs 130 are aware of the total current bandwidth consumption for APN 205, (i.e., reference 255+reference 260+reference 265). More generally, all UPFs 130 will be made aware of the total current bandwidth consumption for APN 205 irrespective of how many UPFs are serving APN 205.

Operations 305, 310, 315 and 320 are repeated periodically, every calendar 5 seconds (for example, $0^{th}$ second of the day, $5^{th}$ second of the day, $10^{th}$ second of the day, $15^{th}$ second of the day and so on till $86{,}400^{th}$ second of the day and so on next day) so that all the UPFs serving a specific APN aware of the current total bandwidth consumption for that APN. Thus, operations 305, 310, 315 and 320 are repeated periodically, e.g., every 5 seconds. Periodicity can be adjusted based on the implementation dependency and the accuracy needed.

Each of UPFs 130 is aware of the total bandwidth consumption for APN 205 across all UPFs 130, and can compare the total bandwidth consumption to the bandwidth limit, i.e., a threshold value. If the bandwidth limit is exceeded, each of UPFs 130 shall carry out a configured action, i.e., a programmed action, such as a drop of additional packets, for example. Thus, UPFs 130, collectively, can enforce a configured maximum bandwidth limit for APN 205.

As illustrated in FIG. 3, the sharing of bandwidth consumption of each UPF with lesser number of signaling message exchanges across all the UPFs serving an APN enables the UPFs to implement APN/DNN total bandwidth per APN/DNN across the CSP's UPFs. This method causes less signaling as the elected delegator carries out broadcast to all other UPFs rather than each UPF talking to every other UPF in terms of receiving and sending each of the bandwidth consumption.

Each of UPF 115, UPF 120 and UPF 125 is implemented in a device that includes electronic circuitry that performs operations to execute methods or processes described herein. The circuitry may be implemented with any or all of (a) discrete electronic components, (b) firmware, or (c) a programmable circuit that includes a processor and a memory. Such a processor is an electronic device configured of logic circuitry that responds to and executes instructions. Such a memory is a tangible, non-transitory, computer-readable storage device encoded with a computer program. In this regard, the memory stores data and instructions, i.e., program code, that are readable and executable by the processor for controlling operations of the processor. The memory may be implemented in a random-access memory (RAM), a hard drive, a read only memory (ROM), or a combination thereof.

Such a processor and memory may be implemented in a computer. The computer can be a standalone device or coupled to other devices in a distributed processing system.

Additionally, the program code may be configured on a storage device for subsequent loading into the memory. Such a storage device is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled to devices upon which UPF 115, UPF 120 and UPF 125 are implemented, via network 110.

The program code may be configured in one or more modules. The term "module" is used herein to denote a functional operation that may be embodied either as a stand-alone component or as an integrated configuration of a plurality of subordinate components. Thus, a module may be implemented as a single module or as a plurality of sub-ordinate modules that operate in cooperation with one another.

Although network 100 is shown as having three UPFs, in practice, network 110 may contain any number of UPFs, and there may be any number of APNs and UEs. Moreover, in a case of multiple APNs, each APN can have its own bandwidth limit.

The present disclosure relates to any 3GPP release versions or generations, and relates more particularly to accessing of data by various users using an Access Point Name (APN) or Data Network Name (DNN) in the data networks. This disclosure inherently covers fixed broadband and Wi-Fi Access networks as well.

The techniques described herein are exemplary and should not be construed as implying any limitation on the present disclosure. Various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. A method for sharing bandwidth consumption information in a communication system having a first user plane function (UPF) that serves an access point name (APN), a second UPF that serves said APN, and a third UPF that serves said APN, wherein said method comprises:

receiving by said first UPF from said second UPF, information indicating a current bandwidth being consumed by said second UPF for said APN;

receiving by said first UPF from said third UPF, information indicating a current bandwidth being consumed by said third UPF for said APN;

sending from said first UPF to said second UPF, information indicating a current bandwidth being consumed by said first UPF for said APN and said current bandwidth being consumed by said third UPF for said APN; and sending from said first UPF to said third UPF, information indicating said current bandwidth being consumed by said first UPF for said APN and said current bandwidth being consumed by said second UPF for said APN, whereby each of said first UPF, said second UPF and said third UPF is thus aware of a total current bandwidth being consumed by said first UPF, said second UPF and said third UPF for said APN.

2. The method of claim 1, wherein said first UPF performs further operations of:

comparing said total current bandwidth to a threshold value; and performing a programmed action in response to said total current bandwidth exceeding said threshold value.

3. The method of claim 2, wherein said programmed action is an action selected from the group consisting of dropping packets and prioritizing packets.

4. The method of claim 1, wherein said second UPF performs further operations of:

comparing said total current bandwidth to a threshold value; and performing a programmed action in response to said total current bandwidth exceeding said threshold value.

5. The method of claim 4, wherein said programmed action is an action selected from the group consisting of dropping packets and prioritizing packets.

6. The method of claim 1, wherein at least one of:

a) said method is executed periodically; and b) i) said first UPF is nominated as a delegator to perform said method, and ii) said second UPF is elected as said delegator in response to a failure of said first UPF.

7. A communication system, comprising:

a first user plane function (UPF) that serves an access point name (APN), a second UPF that serves said APN, and a third UPF that serves said APN, wherein the first, second and third UPFs are each implemented as a programmable circuit comprising a processor and a memory;

wherein said first UPF performs operations of:

receiving from said second UPF, information indicating a current bandwidth being consumed by said second UPF for said APN;

receiving from said third UPF, information indicating a current bandwidth being consumed by said third UPF for said APN;

sending to said second UPF, information indicating a current bandwidth being consumed by said first UPF for said APN and said current bandwidth being consumed by said third UPF for said APN; and sending to said third UPF, information indicating said current bandwidth being consumed by said first UPF for said APN and said current bandwidth being consumed by said second UPF for said APN, whereby each of said first UPF, said second UPF and said third UPF is thus aware of a total current bandwidth being consumed by said first UPF, said second UPF and said third UPF for said APN.

8. The communication system of claim 7, wherein said first UPF performs further operations of:

comparing said total current bandwidth to a threshold value; and performing a programmed action in response to said total current bandwidth exceeding said threshold value.

9. The communication system of claim 8, wherein said programmed action is an action selected from the group consisting of dropping packets and prioritizing packets.

10. The communication system of claim 7, wherein said second UPF performs further actions of:

comparing said total current bandwidth to a threshold value; and performing a programmed action in response to said total current bandwidth exceeding said threshold value.

11. The communication system of claim 10, wherein said programmed action is an action selected from the group consisting of dropping packets and prioritizing packets.

12. The communication system of claim 7, wherein at least one of:

a) said operations are executed periodically; and b) i) said first UPF is nominated as a delegator to perform said method, and ii) said second UPF is elected as said delegator in response to a failure of said first UPF.

13. A storage device that is non-transitory, comprising instructions that are readable by a processor to cause said processor to perform operations of:

receiving by a first user plane function (UPF) that serves an access point name (APN) from a second UPF that serves said APN, information indicating a current bandwidth being consumed by said second UPF for said APN;

receiving by said first UPF from a third UPF that serves said APN, information indicating a current bandwidth being consumed by said third UPF for said APN;

sending from said first UPF to said second UPF, information indicating a current bandwidth being consumed by said first UPF for said APN and said current bandwidth being consumed by said third UPF for said APN; and sending from said first UPF to said third UPF, information indicating said current bandwidth being consumed by said first UPF for said APN and said current bandwidth being consumed by said second UPF for said APN, whereby each of said first UPF, said second UPF and said third UPF is thus aware of a total current bandwidth being consumed by said first UPF, said second UPF and said third UPF for said APN.

14. The storage device of claim 13, wherein said instructions cause said processor to perform further operations of:

comparing said total current bandwidth to a threshold value; and performing a programmed action in response to said total current bandwidth exceeding said threshold value.

15. The storage device of claim 14, wherein said programmed action is an action selected from the group consisting of dropping packets and prioritizing packets.

16. The storage device of claim 13, wherein said second UPF performs further operations of:

comparing said total current bandwidth to a threshold value; and performing a programmed action in response to said total current bandwidth exceeding said threshold value.

17. The storage device of claim 16, wherein said programmed action is an action selected from the group consisting of dropping packets and prioritizing packets.

18. The storage device of claim 13, wherein at least one of:

a) said operations are executed periodically; and b) i) said first UPF is nominated as a delegator to perform said method, and ii) said second UPF is elected as said delegator in response to a failure of said first UPF.

* * * * *